United States Patent
Abe et al.

(10) Patent No.: US 7,110,397 B1
(45) Date of Patent: Sep. 19, 2006

(54) PACKET TRANSFER APPARATUS

(75) Inventors: Keiko Abe, Yokohama (JP); Hitoshi Ikeda, Yokohama (JP); Masao Higuchi, Kawasaki (JP); Nobuo Shirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/195,080

(22) Filed: Nov. 18, 1998

(30) Foreign Application Priority Data

Mar. 9, 1998 (JP) .................................. 10-057146

(51) Int. Cl.
H04L 12/28 (2006.01)
H04L 12/56 (2006.01)
(52) U.S. Cl. ...................................................... 370/389
(58) Field of Classification Search ................ 370/229, 370/235, 351, 389, 395.1, 395.3, 395.31, 370/395.7, 400–401, 412; 709/238
See application file for complete search history.

(56) References Cited

U.S. PATENT DOCUMENTS

| | | | | |
|---|---|---|---|---|
| 5,909,441 A * | 6/1999 | Alexander et al. ..... | 370/395.53 |
| 6,009,097 A * | 12/1999 | Han ...................... | 370/395.52 |
| 6,064,675 A * | 5/2000 | Alexander et al. .......... | 370/397 |
| 6,172,991 B1 * | 1/2001 | Mori ........................... | 370/389 |
| 6,185,213 B1 * | 2/2001 | Katsube et al. ............. | 370/396 |
| 6,185,215 B1 * | 2/2001 | Aho ............................ | 370/218 |
| 6,188,689 B1 * | 2/2001 | Katsube et al. ............. | 370/252 |
| 6,317,431 B1 * | 11/2001 | Hodgkinson et al. ....... | 370/392 |
| 6,336,129 B1 * | 1/2002 | Ise et al. ..................... | 370/235 |
| 6,343,326 B1 * | 1/2002 | Acharya et al. ............ | 709/238 |
| 6,351,465 B1 * | 2/2002 | Han ....................... | 370/395.43 |
| 6,389,023 B1 * | 5/2002 | Matsuzawa et al. ... | 370/395.31 |
| 2001/0056490 A1 * | 12/2001 | Nagami et al. ............. | 709/227 |

* cited by examiner

*Primary Examiner*—Kevin C. Harper
(74) *Attorney, Agent, or Firm*—Katten Muchin Rosenman LLP

(57) ABSTRACT

A packet transfer apparatus switches and transfers cell or frame signals. The apparatus efficiently routes cell or frame signals that are made from packet data based on Internet protocols. The apparatus has a switch for making a connection path among a first node, a second node, and a routing device, a memory for storing outgoing route data, and a shortcut controller. The shortcut controller monitors outgoing route data contained in a cell or frame signal coming from the routing device, stores the outgoing route data in the memory, checks an input cell or frame signal to see if outgoing route data contained in the input cell or frame signal is equal to the outgoing route data stored in the memory, and if they are equal to each other, controls the switch to form a shortcut between the first node through which the input cell or frame signal has been received and the second node from which the input cell or frame signal is going to be sent out and transfers the input cell or frame signal from the first node to the second node through the shortcut.

7 Claims, 18 Drawing Sheets

RD: ROUTING DEVICE
AS: ATM SWITCH

RD: ROUTING DEVICE
FR: FRAME RELAY SWITCH

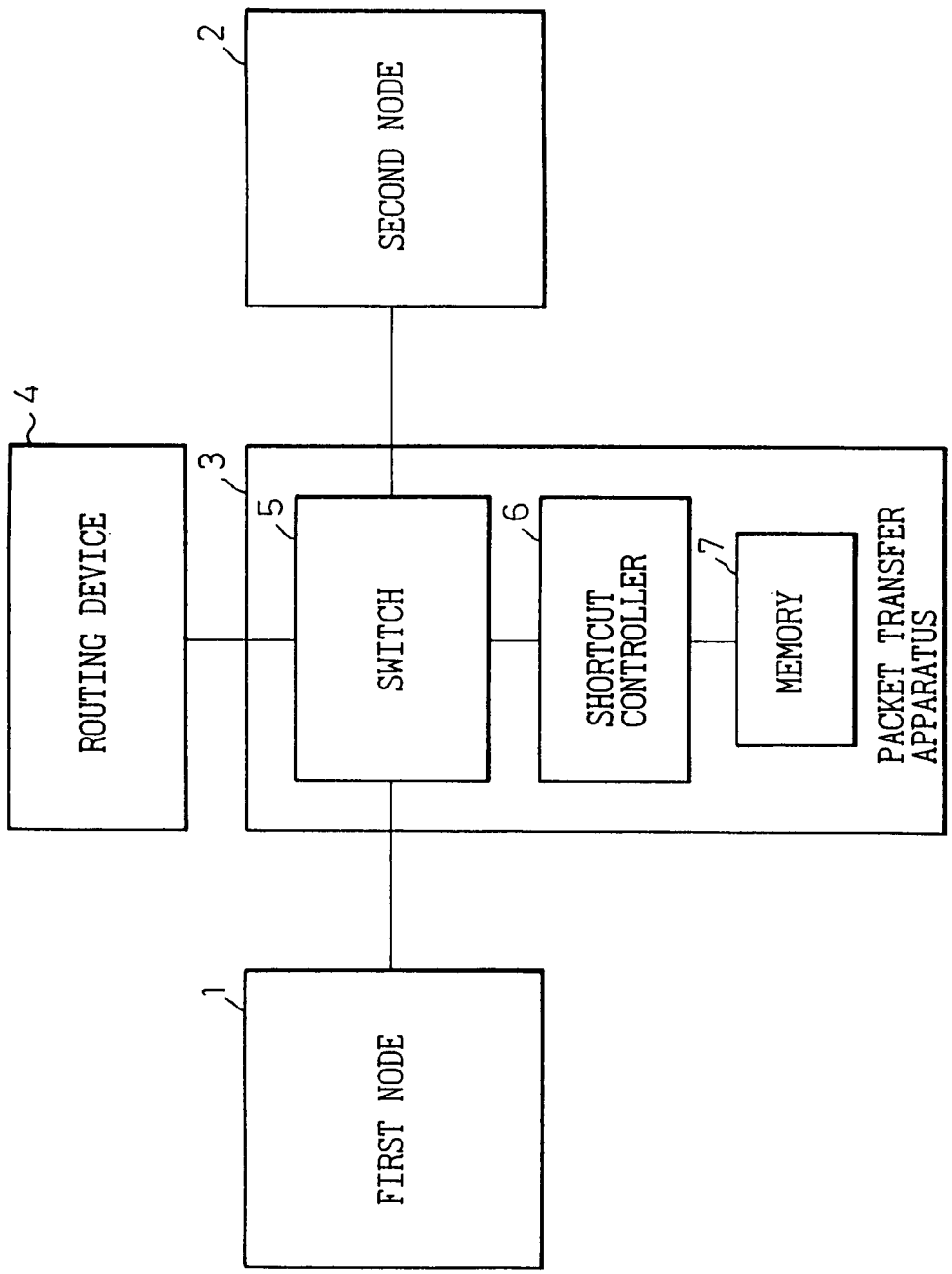

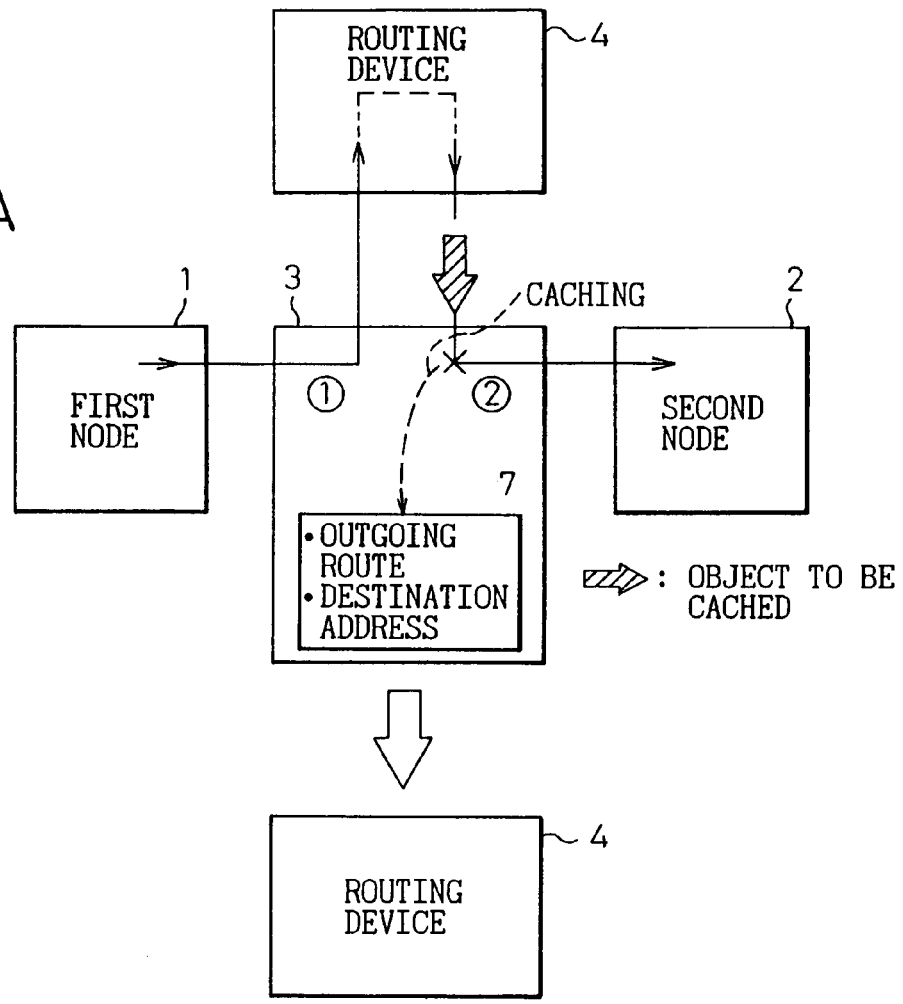
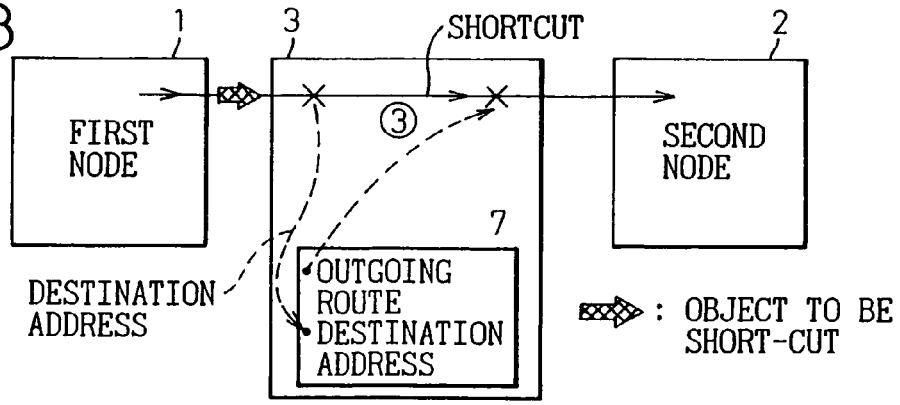

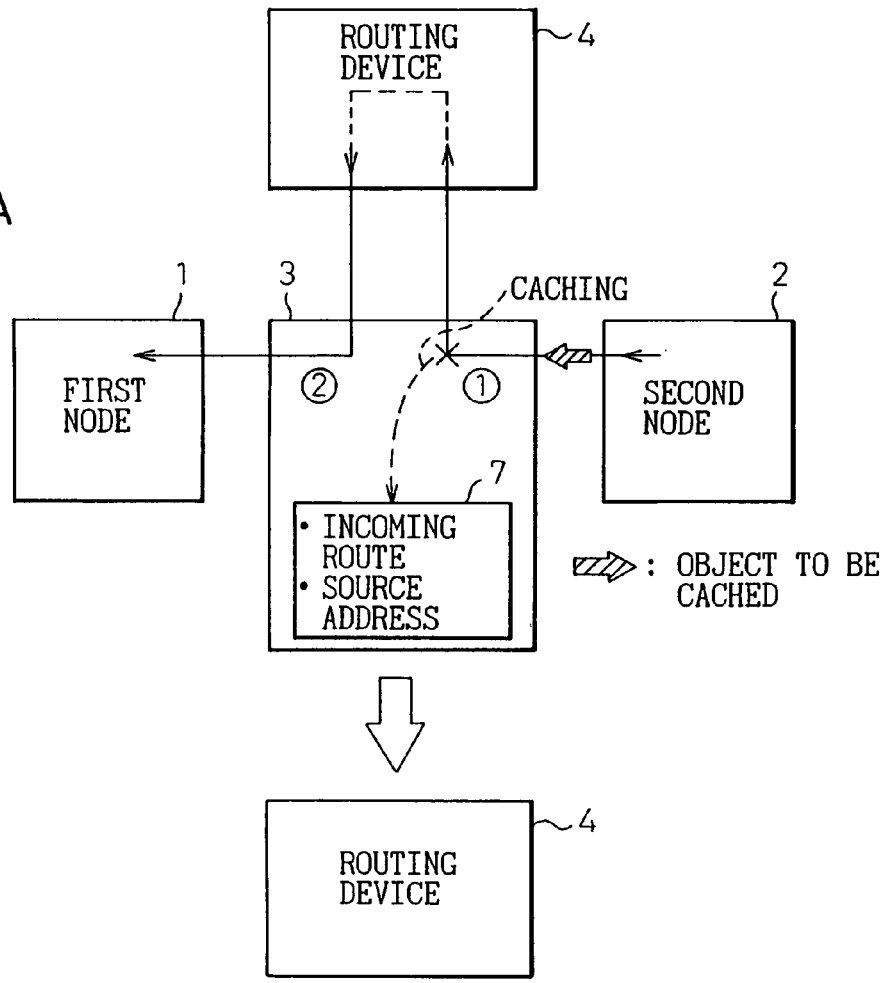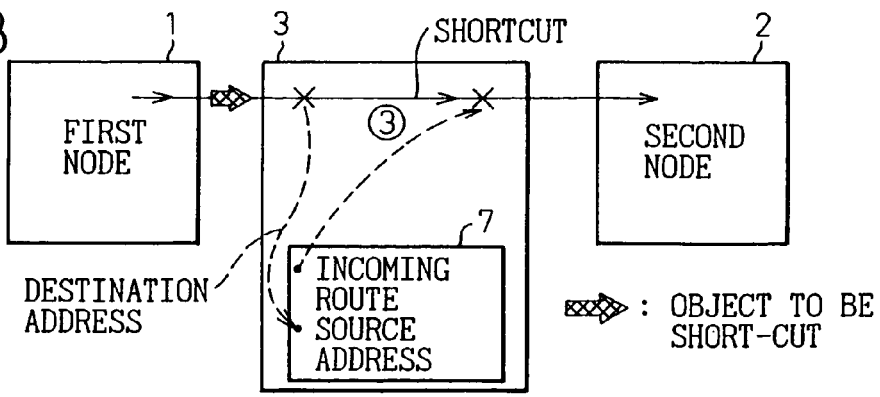

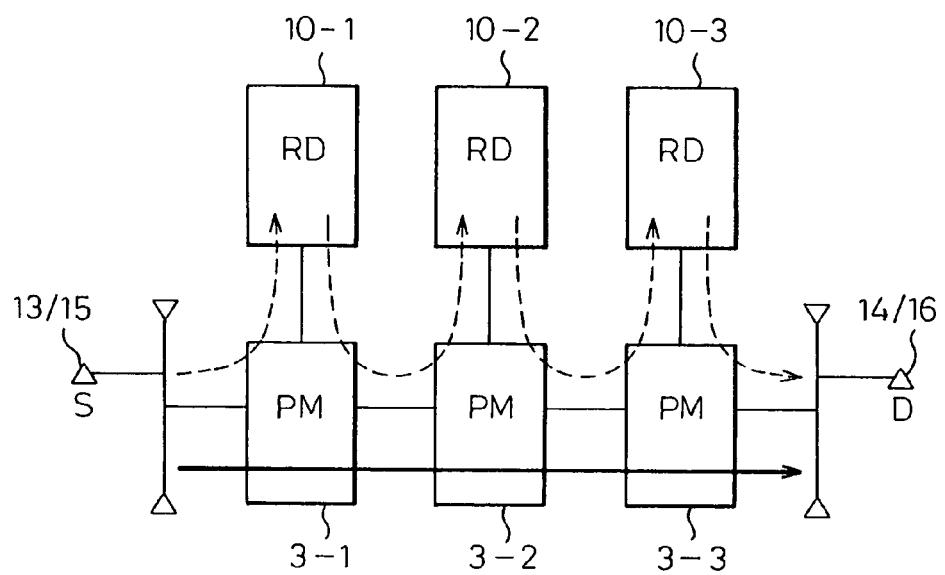

Fig.6
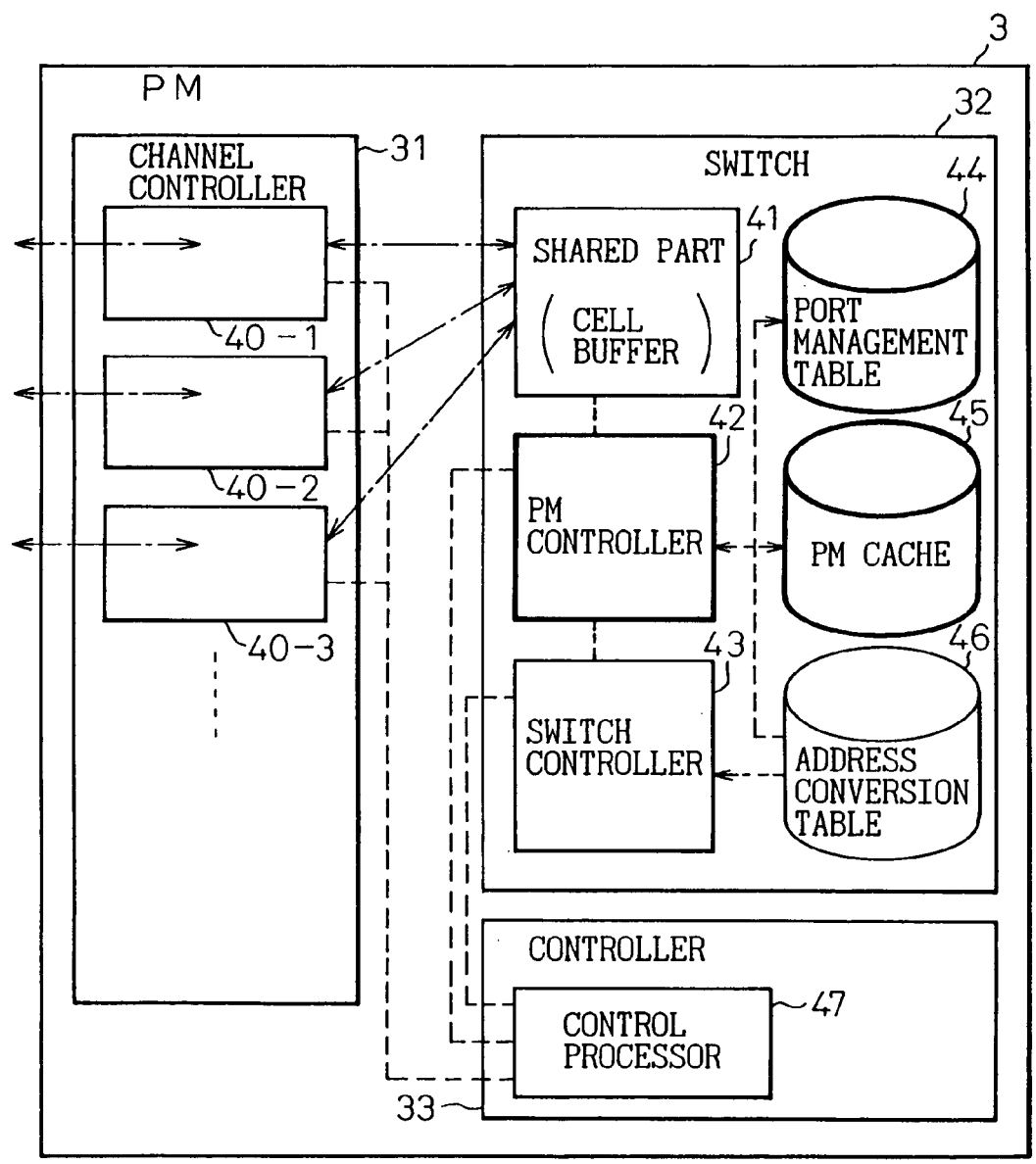
 : FUNCTIONS CHARACTERISTIC TO PM

Fig.9A
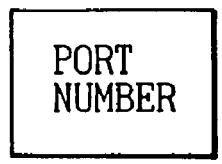
Fig.9B
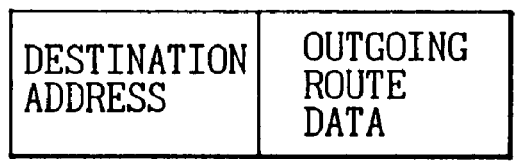
Fig.9C
|  | DESTINATION ADDRESS | OUTGOING ROUTE DATA |
|---|---|---|
| CACHE REGISTERING (*1) | W | W |
| CACHE UPDATING (*2) |  | W |
| CACHE REFERRING (*3) |  | R |
R: READ
W: WRITE

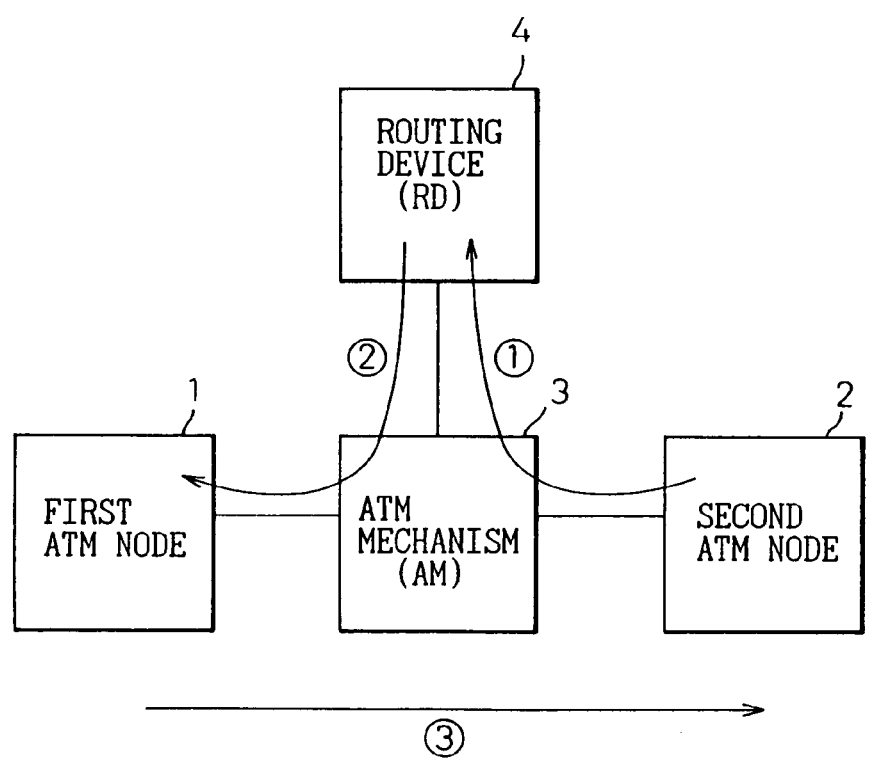

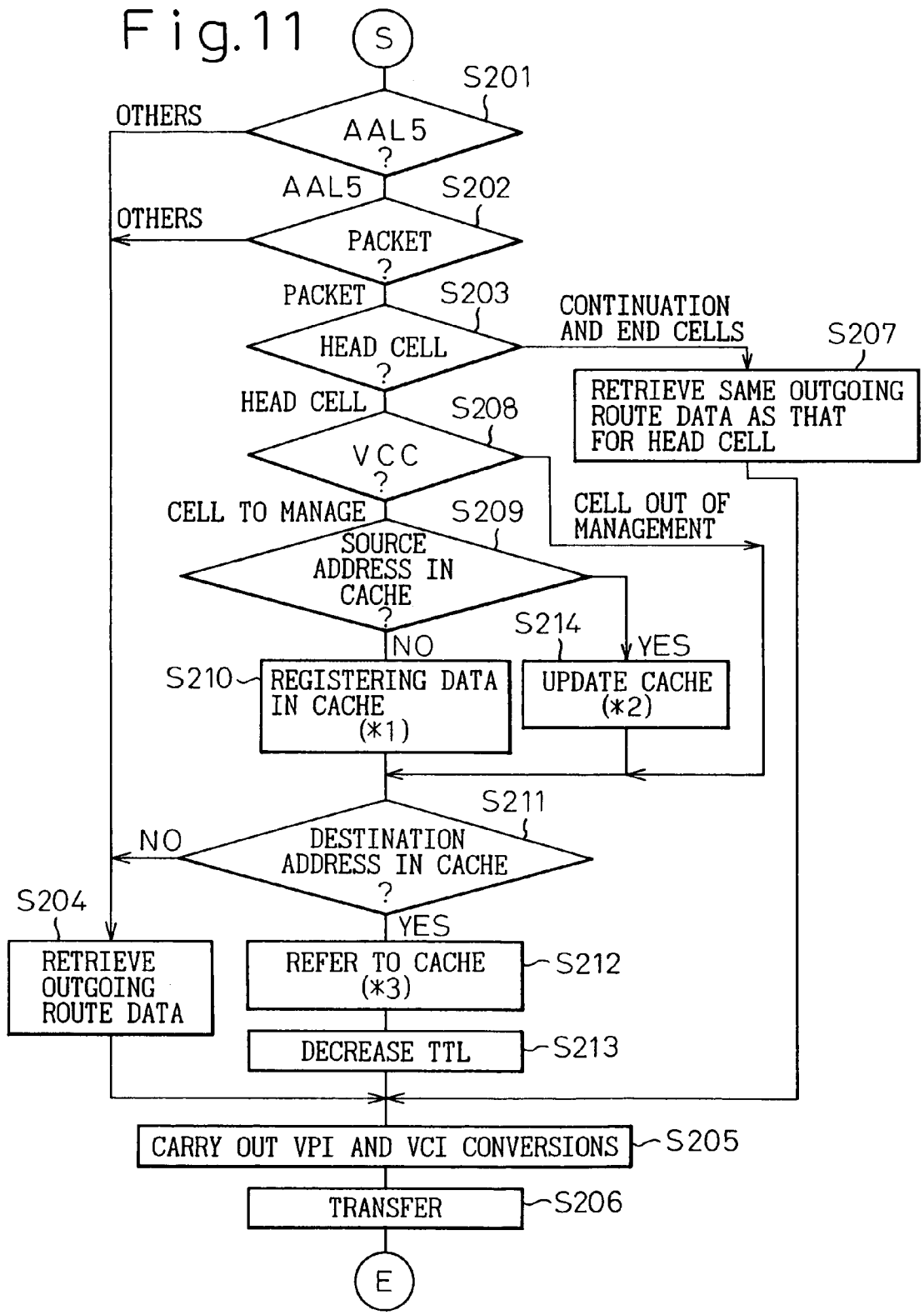

Fig.12A

| PORT NUMBER | VPI | VCI |
|---|---|---|

Fig.12B

| SOURCE ADDRESS | INCOMING ROUTE DATA | | |
|---|---|---|---|
| | PORT NUMBER | VPI | VCI |

Fig.12C

| | SOURCE ADDRESS | INCOMING ROUTE DATA | | |
|---|---|---|---|---|
| | | PORT NUMBER | VPI | VCI |
| CACHE REGISTERING (*1) | W | W | W | W |
| CACHE UPDATING (*2) | | W | W | W |
| CACHE REFERRING (*3) | | R | R | R |

R: READ
W: WRITE

Fig. 15A
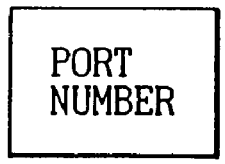
Fig. 15B
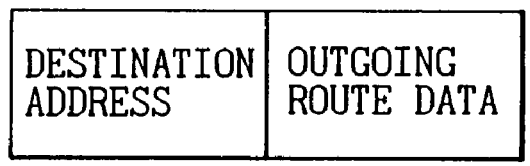
Fig. 15C
|  | DESTINATION ADDRESS | OUTGOING ROUTE DATA |
|---|---|---|
| CACHE REGISTERING (*1) | W | W |
| CACHE UPDATING (*2) |  | W |
| CACHE REFERRING (*3) |  | R |
R: READ
W: WRITE

Fig.18A
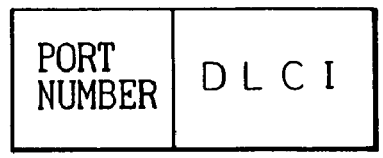
Fig.18B
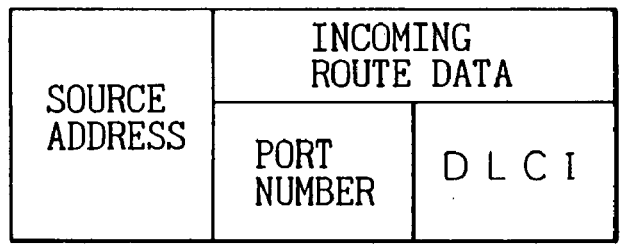
Fig.18C
| | SOURCE ADDRESS | INCOMING ROUTE DATA | |
| --- | --- | --- | --- |
| | | PORT NUMBER | DLCI |
| CACHE REGISTERING (*1) | W | W | W |
| CACHE UPDATING (*2) | | W | W |
| CACHE REFERRING (*3) | | R | R |
R: READ
W: WRITE

PACKET TRANSFER APPARATUS

BACKGROUND OF THE INVENTION

1. Field of the Invention

The present invention relates to an apparatus for switching and transferring cell signals and frame signals, such as an ATM (asynchronous transfer mode) apparatus and a frame relay apparatus. In particular, the present invention relates to a packet transfer apparatus for efficiently routing cell signals and frame signals that carry packets based on Internet protocols.

There is a requirement for improving the speed of Internet communications made through ATM networks and frame relay networks. IETF (Internet Engineering Task Force), which is a group solving technical problems related to the Internet, and ATM forum, which is a group energetically making ATM specifications and promoting the use of them for ATM-WANs (ATM wide area networks), are studying the standardization of ATM networks and frame relay networks. Such standardization needs intricate, large-scale structures involving address management systems and servers. It is necessary to provide a simple, high-speed communication processing technique.

2. Description of the Related Art

An ATM network or a frame relay network involves routers. The network switches and transfers cell signals or frame signals that carry IP (Internet protocol) packets, and the routers route the packets. The speed of Internet communication in the network is slowed down by inefficient processes carried out between the network and the routers.

FIG. 1A shows a prior art for transferring packet signals in the ATM network, and FIG. 1B shows another prior art for transferring packet signals in the frame relay network.

In FIG. 1A, the ATM network has ATM switches (AS) 11-1 to 11-3 that are provided with routing devices (RD) 10-1 to 10-3, respectively. Each of the routing devices 10-1 to 10-3 has a router for routing a packet signal that carries IP packets.

A source terminal (S) 13 transmits a cell signal made from a packet signal. The cell signal is received by the switch 11-1, which transfers the signal to the routing device 10-1 that is fixedly or semi-fixedly connected to the switch 11-1 through PVC (permanent virtual channel) or SVC (switched virtual channel). The routing device 10-1 reconstructs the packet signal from the received cell signal and determines an outgoing route to a destination terminal (D) 14 according to a destination address contained in the signal.

The routing device 10-1 decomposes the packet signal again into a cell signal having VPI and VCI (virtual path identifier and virtual channel identifier) corresponding to the outgoing route and returns the cell signal to the switch 11-1. According to the VPI and VCI, the switch 11-1 transfers the cell signal to the switch 11-2 that is in the outgoing route. The switches 11-2 and 11-3 and routing devices 10-2 and 10-3 operate in the same way to transfer the signal up to the destination terminal 14.

The prior art of FIG. 1B works in the same manner. The frame relay network has frame relay switches (FR) 12-1 to 12-3 that are provided with routing devices (RD) 10-1 to 10-3, respectively. The routing devices 10-1 to 10-3 route packet signals in the frame relay network. A source terminal (S) 15 transmits a frame signal made from a packet signal. The frame signal is received by the switch 12-1, which transfers the signal to the routing device 10-1 that is fixedly or semi-fixedly connected to the switch 12-1.

The routing device 10-1 reconstructs the packet signal from the frame signal and determines an outgoing route to a destination terminal (D) 16 according to a destination address contained in the packet signal. The routing device 10-1 converts the packet signal again into a frame signal having DLCI (data link connection identifier) corresponding to the outgoing route and returns the signal to the switch 12-1. According to the DLCI, the switch 12-1 transfers the frame signal to the switch 12-2 in the outgoing route.

In this way, the prior art of FIG. 1A must reconstruct and decompose an ATM cell signal at every ATM switch, to increase the transfer time. Although original aims of the ATM technique are to improve a transfer rate and expand a bandwidth, the prior art of FIG. 1A is unable to fully demonstrate the advantages of the ATM technique due to the poor performance of the routing devices.

Similarly, the prior art of FIG. 1B must reconstruct a packet signal and convert it into a frame signal at every frame relay switch, to increase the transfer time. Although original aims of the frame relay technique are to improve a transfer rate and expand a bandwidth, the prior art of FIG. 1B is unable to fully demonstrate the advantages of the frame relay technique due to the poor performance of the routing devices.

In the prior art of FIG. 1B, each frame relay switch must dedicate itself to completely process a received frame. If the transmission rate of a frame signal that carries frames is high, the frame relay switch will be unable to follow the signal, thereby causing congestion in the network.

To solve these problems and improve transfer speed, the IETF has proposed NHRP (next hop resolution protocol), and the ATM forum has proposed MPOA (multiprotocol over ATM).

Each of these proposals employs a shortcut technique that makes a direct connection in a network when transferring IP packets. Making a shortcut, however, involves some problems. For example, it involves intricate control and special protocols that need a client-server system and requires every routing device to have a server function.

SUMMARY OF THE INVENTION

An object of the present invention is to provide a packet transfer apparatus that employs an ATM switch having a function of memorizing outgoing route data so that the switch may establish a shortcut bypassing a routing device when transferring packet signals in an ATM network. This apparatus needs no client-server system nor special protocols and eliminates cell reconstruction, cell decomposition, and routing processes from the routing device, thereby reducing load on the routing device and transferring packet signals at high speed in the ATM network.

Another object of the present invention is to provide a packet transfer apparatus that employs a frame relay switch having a function of memorizing outgoing route data so that the switch may establish a shortcut bypassing a routing device when transferring packet signals in a frame relay network. This apparatus needs no special protocols and eliminates data preparation, frame preparation, and routing processes from the routing device, thereby reducing load on the routing device and transferring packet signals at high speed in the frame relay network.

In order to accomplish the objects, the present invention provides a packet transfer apparatus for switching and transferring a cell signal or a frame signal among first and second nodes and a routing device. Each of the nodes has a communication interface for the cell or frame signal. The routing device has a communication interface for the cell or frame signal and determines an outgoing route according to a destination address contained in the cell or frame signal. This apparatus has a switch for establishing a connection path among the nodes and the routing device, a memory for storing outgoing route data, and a shortcut controller. The shortcut controller monitors outgoing route data contained in a cell or frame signal sent from the routing device, and stores the outgoing route data in the memory. If the succeeding cell or frame signal has the same outgoing route data as that stored in the memory, the shortcut controller controls the switch to form a shortcut between the first node serving as an input end and the second node serving as an output end and transfers the succeeding cell or frame signal directly from the first node to the second node through the shortcut.

The present invention also provides a packet transfer apparatus for switching and transferring a cell signal or a frame signal among first and second nodes and a routing device. Each of the nodes has a communication interface for the cell or frame signal. The routing device has a communication interface for the cell or frame signal and determines an outgoing route according to a destination address contained in the cell or frame signal. This apparatus has a switch for establishing a connection path among the nodes and routing device, a memory for temporarily storing outgoing route data, and a shortcut controller. The shortcut controller monitors source data contained in a cell or frame signal sent from the first or second node and stores the source data as outgoing route data in the memory. If the succeeding cell or frame signal has the same outgoing route data as that stored in the memory, the shortcut controller controls the switch to form a shortcut between the first and second nodes and transfers the succeeding cell or frame signal through the shortcut.

BRIEF DESCRIPTION OF THE DRAWINGS

The present invention will be more clearly understood from the description as set forth below with reference to the accompanying drawings, in which:

FIG. 2 shows a basic structure of a packet transfer apparatus according to the present invention;

FIGS. 3A and 3B show a first principle operation of the packet transfer apparatus of the present invention;

FIGS. 4A and 4B show a second principle operation of the packet transfer apparatus of the present invention;

FIG. 5 shows packet transfer operations in a network according to the present invention;

FIG. 6 shows functional blocks of a packet transfer mechanism according to the present invention;

FIGS. 9A to 9C show examples of data in a cache of the ATM mechanism of FIG. 7;

FIG. 10 shows the ATM mechanism operating according to the second principle operation of the present invention;

FIG. 11 is a flowchart showing the details of operation of the ATM mechanism of FIG. 10;

FIGS. 12A to 12C show examples of data in the cache of the ATM mechanism of FIG. 10;

FIGS. 15A to 15C show examples of data in a cache of the frame relay mechanism of FIG. 13;

FIGS. 18A to 18C show examples of data in the cache of the frame relay mechanism of FIG. 16.

DESCRIPTION OF THE PREFERRED EMBODIMENTS

Figure 1A:
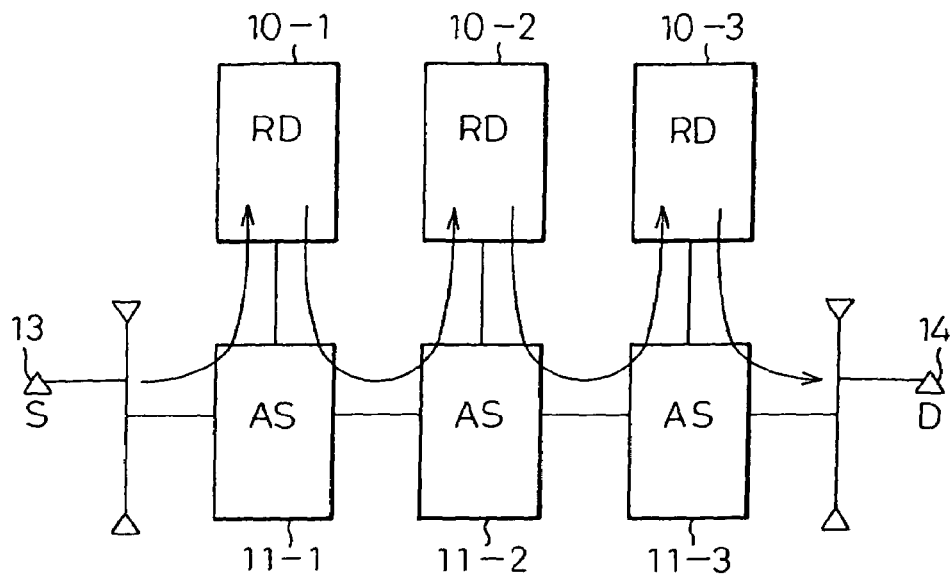
FIG. 1A shows a prior art for transferring packet signals through an ATM network.

FIG. 2 shows a basic structure of a packet transfer apparatus according to the present invention.

First and second communication nodes 1 and 2 have each a communication interface for handling cell signals or frame signals. The packet transfer apparatus 3 switches and transfers cell signals or frame signals among the nodes 1 and 2 and a routing device 4.

The routing device 4 has a communication interface for handling cell signals or frame signals. The routing device 4 receives a cell or frame signal from the packet transfer apparatus 3, reconstructs a packet signal from the cell or frame signal, and determines an outgoing route according to a destination address contained in the packet signal. Thereafter, the routing device 4 decomposes the packet signal again into a cell or frame signal and sends the cell or frame signal to the apparatus 3. The nodes 1 and 2 are each an exchange or a terminal having a communication interface for handling cell signals or frame signals.

The details of the packet transfer apparatus 3 will be explained.

A switch 5 makes a connection path among the nodes 1 and 2 and routing device 4. A memory 7 temporarily stores outgoing route data contained in a cell or frame signal. A shortcut controller 6 monitors outgoing route data contained in a cell or frame signal that has been prepared from a packet signal and temporarily stores the outgoing route data in the memory 7. Thereafter, the shortcut controller 6 compares the stored data with outgoing route data contained in the succeeding cell or frame signal. If they agree with each other, the shortcut controller 6 instructs the switch 5 to form a shortcut between the nodes 1 and 2.

FIGS. 3A and 3B show a first principle operation of the packet transfer apparatus 3.

A cell signal carries a series of cells that are made from a packet of data, and a frame signal is a multiplexed signal to carry a packet of data. In FIG. 3A, the node 1 supplies a cell or frame signal to the apparatus 3. If the signal is a first one, it is transferred by the switch 5 to the routing device 4 through a fixed or semi-fixed path as indicated with a reference mark ①. The shortcut controller 6 monitors a destination address contained in every input signal.

The routing device 4 reconstructs an original packet data from the received cell or frame signal and determines an outgoing route according to a destination address contained in the packet data. The routing device 4 converts the packet data into a cell or frame signal, adds outgoing route data to the signal, and returns the signal to the apparatus 3. The apparatus 3 sends the signal through the switch 5 according to the outgoing route data. At this time, the shortcut controller 6 temporarily stores the outgoing route data and destination address in the memory 7 as indicated with a reference mark ②.

FIG. 3B shows an operation that follows the operation of FIG. 3A. The shortcut controller 6 compares the destination address stored in the memory 7 with a destination address contained in an input signal that follows the preceding signal. If they agree with each other, the shortcut controller 6 instructs the switch 5 to form a shortcut that directly connects the nodes 1 and 2 to each other according to the stored outgoing route data as indicated with a reference mark ③. Thereafter, a series of signals are transferred through the shortcut at high speed by bypassing the routing device 4.

FIGS. 4A and 4B show a second principle of operation of the packet transfer apparatus 3.

In FIG. 4A, the node 2 supplies a cell signal or a multiplexed frame signal made from a packet signal to the apparatus 3. The shortcut controller 6 monitors input signals other than those from the routing device 4, and upon detecting an input signal, stores a source address and incoming route data contained in the input signal in the memory 7 as indicated with a reference mark ①.

At this time, the shortcut controller 6 determines whether or not the memory 7 has a source address that agrees with a destination address contained in the input signal. In the example of FIG. 4A, the memory 7 has no such source address, and therefore, the input signal is transferred to the routing device 4 as indicated with a reference mark ②.

In FIG. 4B, the node 1 supplies a cell signal or a multiplexed frame signal made from a packet signal to the apparatus 3. The shortcut controller 6 monitors input signals other than those from the routing device 4, and upon detecting an input signal, stores a source address and incoming route data contained in the input signal in the memory 7.

At this time, the shortcut controller 6 checks to see if the memory 7 has a source address that agrees with a destination address contained in the input signal. In the example of FIG. 4B, the destination address contained in the input signal agrees with the source address stored in the memory 7 in FIG. 4A. Then, the shortcut controller 6 instructs the switch 5 to form a shortcut to directly connect the nodes 1 and 2 to each other according to the source address and corresponding incoming route data as indicated with a reference mark ③. As a result, the input signal is transferred through the shortcut at high speed by bypassing the routing device 4.

In this way, the first principle of operation of the present invention examines the destination of a first signal and switches second and succeeding signals to a shortcut at high speed if the second and succeeding signals have the same destination as that of the first signal. The second principle of operation of the present invention transfers a signal through a shortcut at high speed if the destination of the signal is registered in the memory 7.

If an ATM network is used to transfer a signal and if a destination address contained in the signal agrees with an address stored in the memory 7, the first and second principles of operation of the present invention eliminate the following tasks (1) to (7) from the packet transfer apparatus 3 and routing device 4 (in the following tasks, "AM" represents an ATM mechanism that is equivalent to the packet transfer apparatus 3 applied to an ATM network, and "RD" represents the routing device 4):

(1) Detecting an outgoing route from AM to RD for the signal (task of AM)
(2) Transferring the signal from AM to RD (AM)
(3) Reconstructing a packet from the signal (RD)
(4) Routing (RD)
(5) Decomposing the packet into a signal (RD)
(6) Transferring the signal from RD to AM (RD)
(7) Detecting an outgoing route from AM to the second node for the signal (AM)

A packet of data transmitted through the ATM network is divided into cells having a fixed length according to an ATM adaptation layer (AAL, a transmission technique that is independent of communication media and carries out packet decomposition, reconstruction, and verification). The cells are classified into a head cell, continuation cells, and an end cell, which are successively transmitted as a cell signal.

AAL5 is one of the AAL protocols that is mainly applied to data communication and aims to improve transfer efficiency. A head cell in a cell signal prepared from a packet signal according to AAL5 includes a destination address and a source address. Accordingly, the packet transfer apparatus 3 may monitor an ATM head cell without reconstructing and decomposing a packet and store a destination address, a source address, and outgoing route data in the memory 7.

If a frame relay network is used to transfer a signal and if a destination address contained in the signal agrees with an address stored in the memory 7, the first and second principle operations of the present invention eliminate the following tasks (1) to (7) from the packet transfer apparatus 3 and routing device 4 (in the following tasks, "FM" represents a frame relay mechanism that is equivalent to the packet transfer apparatus 3 applied to a frame relay network, and "RD" represents the routing device 4):

(1) Detecting an outgoing route from FM to RD for the signal (task of FM)
(2) Transferring the signal from FM to RD (FM)
(3) Reconstructing data from the signal (RD)
(4) Routing (RD)
(5) Preparing a signal from the data (RD)
(6) Transferring the signal from RD to FM (RD)
(7) Detecting an outgoing route from FM to the second node for the signal (FM)

Figure 1B:
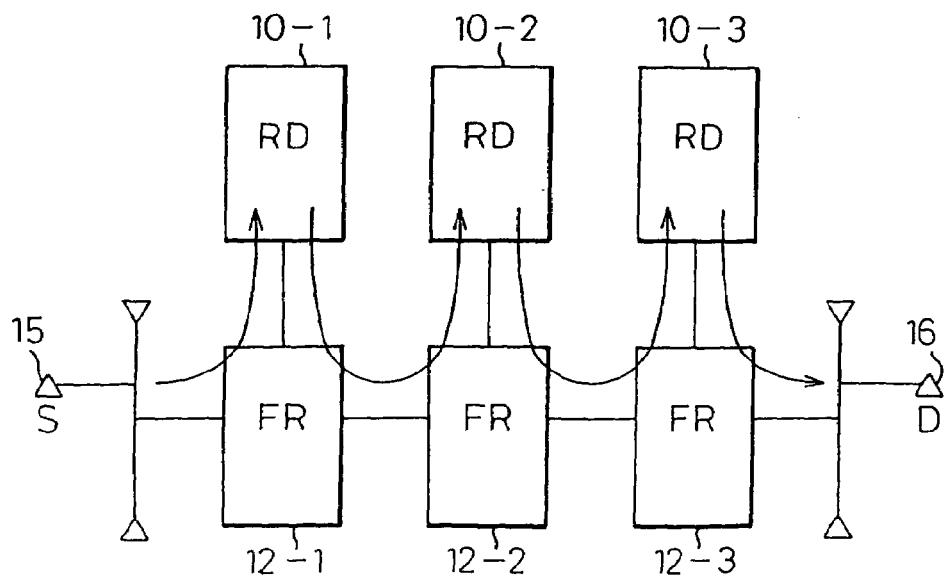
FIG. 1B shows another prior art for transferring packet signals through a frame relay network.

FIG. 5 shows the operation of a network employing the apparatus of the present invention of FIGS. 2 to 3B and shall be compared with the prior arts of FIGS. 1A and 1B.

In the following explanation to be made with reference to FIGS. 5 to 18C, the packet transfer apparatus is referred to as the "packet transfer mechanism (PM)" when handling both ATM and frame relay signals, as the "ATM mechanism (AM)" when handling only ATM signals, and as the "frame relay mechanism (FM)" when handling only frame relay signals.

The ATM mechanism has an ATM switch (AS in FIG. 1A, 5 in FIG. 2) to which the function of memorizing outgoing route data of the present invention (6 and 7 in FIG. 2) is added. The ATM switch has an ATM interface that is connected to a routing device. Similarly, the frame relay mechanism has a frame relay switch (FR in FIG. 1B, 5 in FIG. 2) to which the function of memorizing outgoing route data of the present invention (6 and 7 in FIG. 2) is added. The frame relay switch has a frame relay interface that is connected to a routing device.

Routing devices 10-1 to 10-3 are standard routers each having an ATM interface or a frame relay interface and packet transferring and routing functions.

In FIG. 5, dotted lines indicate ordinary signal transfer paths (FIGS. 1A and 1B), and a continuous thick line indicates a signal transfer path that is formed after outgoing route data is stored in a memory of each of packet transfer mechanisms 3-1 to 3-3. In this way, the present invention easily makes a shortcut across the packet transfer mechanisms 3-1 to 3-3, to transfer packet signals at high speed.

FIG. 6 shows functional blocks of the packet transfer mechanism of the present invention.

Major functional blocks related to the present invention will be explained.

A channel controller 31 is a standard one generally provided for an ATM switch or a frame relay switch. The channel controller 31 has ports 40-1 to 40-3 and serves as an interface with a routing device and ATM or frame relay nodes that are connected to the ports 40-1 to 40-3.

A switch 32 is a standard one generally provided for an ATM switch or a frame relay switch that switches ATM cells and frame signals received through the channel controller 31. The present invention additionally has a packet transfer controller 42, a port management table 44, and a cache 45.

The controller 42 and table 44 correspond to the shortcut controller 6 of FIG. 2. The cache 45 corresponds to the memory 7 of FIG. 2. A controller 33 is a standard one generally provided for an ATM switch or a frame relay switch, to control and manage SVCs (switched virtual channels).

Figure 7:
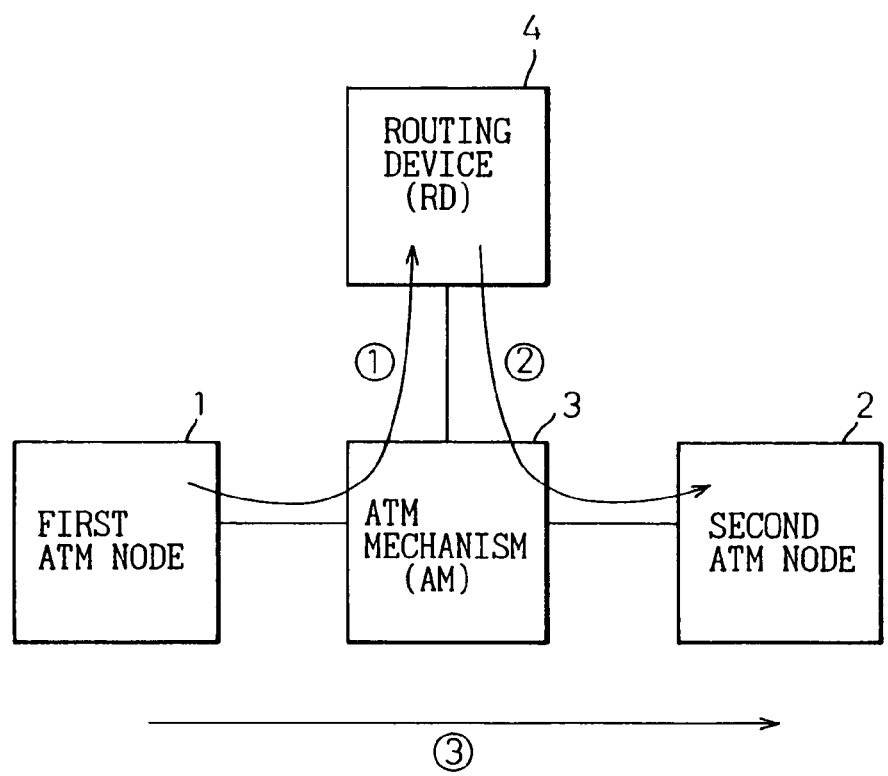
FIG. 7 shows an ATM mechanism operating according to the first principle operation of the present invention.
Figure 8:
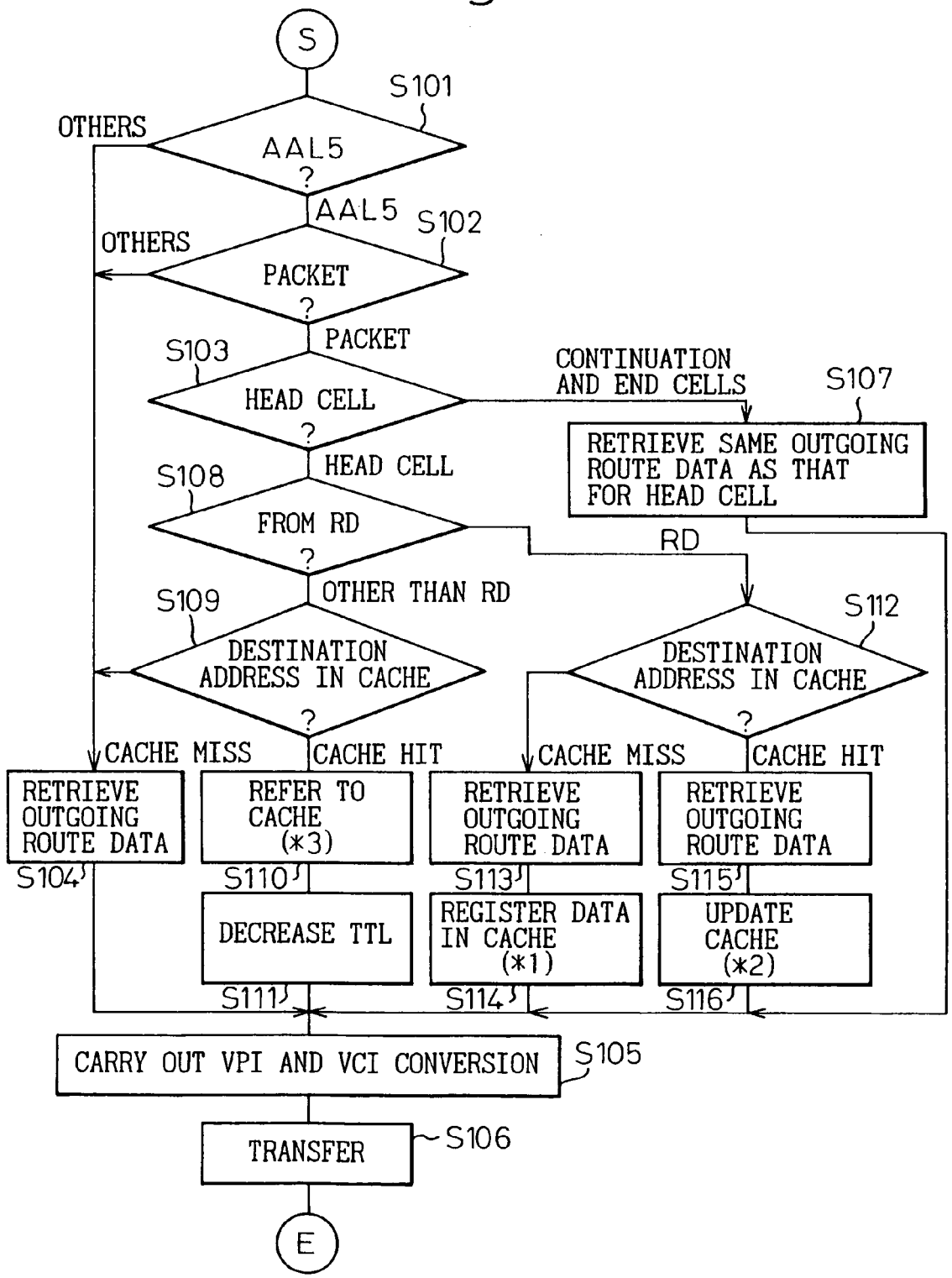
FIG. 8 is a flowchart showing the details of operation of the ATM mechanism of FIG. 7.

FIGS. 7 to 9C show an ATM mechanism 3 operating according to the first principle of operation of the present invention. The ATM mechanism 3 has the same functional blocks as those of FIG. 6. FIG. 7 shows an outline of the ATM mechanism, FIG. 8 is a flowchart showing the details of the operation of the same, and FIGS. 9A to 9C show examples of data in a cache of the mechanism. The operation of the ATM mechanism 3 will be explained mainly with reference to the flowchart of FIG. 8, and the related parts thereof, with reference to FIGS. 7 and 9A to 9C.

The port management table 44 and cache 45 (FIG. 6) will briefly be explained first. At the start of the ATM mechanism 3, a port number to which a routing device 4 is connected is set in the table 44 as shown in FIG. 9A. The controller 42 refers to the table 44 and determines whether a received ATM cell signal is from the routing device 4 or from another node.

The cache 45 stores outgoing route data and a destination address for a signal received from the routing device 4 as shown in FIG. 9B. When a signal is received, the table 44 is referred to. If the table tells that the received signal is from a node other than the routing device 4, the cache 45 is referred to, to determine an outgoing route by bypassing the routing device 4.

In the flowchart of FIG. 8, the controller 42 checks ATM cells contained in a received signal one by one. Step S101 checks to see if the cell is based on AAL5. Step S102 checks to see if the cell is based on a packet (IP packet). If none of steps S101 and S102 is true, it is determined that the cell is an ATM cell containing voice data or data other than packet data, and an ordinary ATM switching process is carried out in steps S104 to S106.

The ordinary ATM switching process will be explained. Each ATM cell has VPI and VCI. Virtual channel connection (VCC) corresponding to an outgoing route is uniquely determined according to a combination of an outgoing port number and VPI and VCI. Accordingly, step S104 retrieves an outgoing port number and VPI and VCI from the address conversion table 46 based on an incoming port number and VPI and VCI contained in the cell in question. Step S105 carries out VPI and VCI conversions, and step S106 transfers the cell.

If steps S101 and S102 are each true, step S103 determines whether the cell in question is a head cell, a continuation cell, or an end cell. If it is a head cell, one of the below-mentioned processes (1) to (3) is carried out on the cell. If the cell is a continuation cell or an end cell, step S107 refers to the same outgoing route data as that for the head cell, and the switching process of steps S105 and S106 is carried out.

(1) This process is carried out if the cell in question is from an ATM node 1 and if the cache 45 holds no address equal to a destination address contained in the cell (①) of FIG. 7).

Step S108 refers to the port management table 44 and recognizes that the cell is from the node 1. Step S109 checks the cache 45 and finds that the cache 45 holds no address equal to the destination address contained in the cell.

Accordingly, the ordinary switching process of steps S104 to S106 is carried out. Namely, step S104 determines an outgoing route from the node 1 to the routing device 4, step S105 carries out VPI and VCI conversions, and step S106 transfers the cell to the routing device 4.

(2) This process is carried out if the cell in question is from the routing device 4 (②of FIG. 7).

Step S108 refers to the port management table 44 and recognizes that the cell is from the routing device 4. Step S112 checks the cache 45 to see if it holds an address equal to the destination address contained in the cell.

If the destination address is not held in the cache 45, step S113 retrieves outgoing route data from the address conversion table 46 and stores the outgoing route data and destination address in the cache 45 as shown in FIG. 9C. Thereafter, the switching process of steps S105 and S106 is carried out.

If the destination address is held in the cache 45, step S115 retrieves outgoing route data from the table 46, and step S116 updates outgoing route data held in the cache 45 as shown in FIG. 9C. Thereafter, the switching process of steps S105 and S106 is carried out.

(3) This process is carried out if the cell in question is from the node 1 and if the cache 45 holds an address equal to the destination address contained in the cell (③of FIG. 7).

Step S108 refers to the port management table 44 and recognizes that the cell is from a node other than the routing device 4. Step S109 checks the cache 45 and finds that the cache 45 holds an address equal to the destination address contained in the cell. Step S110 retrieves outgoing route data from the cache 45 according to the destination address as shown in FIG. 9C.

The contents of the cache 45 shown in FIG. 9C are registered in the process (2) mentioned above. In this example, the node 2 is on the outgoing side. Since the process (3) transfers the cell from the node 1 to the node 2 through a shortcut that bypasses the routing device 4, step S111 decreases TTL (time to live) that indicates an existing time of the corresponding packet in the network. Thereafter, the switching process of steps S105 and S106 is carried out with the use of the shortcut.

FIGS. 10 to 12C show the ATM mechanism 3 operating according to the second principle operation of the present invention, in which FIG. 10 shows an outline of the ATM mechanism, FIG. 11 is a flowchart showing the details of operation of the same, and FIGS. 12A to 12C show examples of data in the cache 45. The operation of the ATM mechanism 3 will be explained mainly with reference to the flowchart of FIG. 11 and related parts thereof with reference to FIGS. 10 and 12C.

The functions and operations of the port management table 44 and cache 45 are the same as those explained with reference to FIG. 7 except data stored in the cache 45. FIG. 12A shows the contents of the port management table 44 when the ATM mechanism 3 is started. Namely, the controller 42 receives a cell signal from a VCC other than the routing device 4, extracts a source address and incoming route data from the signal, and stores the extracted data in the cache 45.

Thereafter, a cell transferred from any node including the routing device 4 irrespective of the VCC is checked to see if a destination address contained in the cell is equal to the address stored in the cache 45. If they are equal to each other, an outgoing route for the cell is prepared from the port number and VPI and VCI stored in the cache 45.

In FIG. 11, step S201 checks to see if a received cell is based on AAL5, step S202 checks to see if the cell is based on a packet, and step S203 checks to see if the cell is a head cell. If the received cell is a voice cell, etc., in step S202, an ordinary switching process of steps S204 to S206, which is the same as the switching process of steps S104 to S106 of FIG. 8, is carried out. If the received cell is not a head cell in step S203, steps S207, S205, and S206, which are the same as steps S107, S105, and S106 of FIG. 8, are carried out with the same outgoing route data as that for the head cell.

If steps S201 to S203 are each true, one of the following processes (1) to (3) is carried out on the cell in question:

(1) This process is carried out if the cell is based on a packet and is from the ATM node 2 and if a destination address contained in the cell is not held in the cache 45 (①of FIG. 7).

In step S208, the controller 42 refers to the port management table 44 and finds that VCC that has transmitted the cell is irrelevant to the routing device 4.

Step S209 checks the cache 45 to see if the cache 45 has an address that is equal to a source address contained in the cell. If the cache 45 holds no such address, step S210 registers the source address and incoming route data including a port number and VPI and VCI contained in the cell in the cache 45 as shown in FIGS. 12B and 12C.

If the cache 45 holds an address equal to the source address contained in the cell, step S214 updates incoming route data in the cache 45 according to the port number and VPI and VCI contained in the cell as shown in FIG. 12C.

Step S211 checks the cache 45 and finds that the cache 45 has no address that is equal to a destination address contained in the cell. Therefore, the switching process of steps S204 to S206 is carried out.

(2) This process is carried out if the received cell is based on a packet and is from the routing device 4 and if the destination address contained in the cell is not held in the cache 45 (② of FIG. 7).

In step S208, the controller 42 refers to the port management table 44 and finds that the VCC that has transmitted the cell is from the routing device 4.

Accordingly, data contained in the cell is not registered in the cache 45, and step S211 checks the cache 45 and finds that the cache 45 has no address that is equal to the destination address contained in the cell. Therefore, the switching process of steps S204 to S206 is carried out.

(3) This process is carried out if the received cell is based on a packet and is from the ATM node 1 and if the destination address contained in the cell is held in the cache 45 (③ of FIG. 7).

The cell received from the ATM node 1 is processed through steps S208 to S210 and S214 in the same manner as that explained in the process (1). Step S211 finds that the destination address contained in the cell is held in the cache 45. Step S212 refers to the source address in the cache 45 that is equal to the destination address in the cell and determines outgoing route data for the cell according to incoming route data registered in the cache 45 as shown in FIG. 12C.

These pieces of data in the cache 45 have been registered in the process (1). At this moment, the ATM node 2 is on the outgoing side. Since the process (3) transfers the cell from the node 1 to the node 2 through a shortcut that bypasses the routing device 4, step S213 decreases TTL (time to live) that indicates an existing time of the corresponding packet in the network. Thereafter, the switching process of steps S205 and S206 is carried out with the use of the shortcut.

This completes the explanation of the operation of the ATM mechanism. The operation of the frame relay mechanism will now be explained.

First, frame relay switching will briefly be explained. To identify an outgoing route, each frame has a DLCI (data link connection identifier) in a header and carries out multiplexed communication. A logic channel serving as an outgoing route for a given frame is uniquely identified according to a combination of an outgoing port number and outgoing DLCI for the given frame. The frame relay mechanism refers to the address conversion table 46 (FIG. 6) according to an incoming port number and DLCI of a frame received through the channel controller 31 and finds an outgoing port number and outgoing DLCI as outgoing route data for the frame. According to the data, frame switching is carried out.

Figure 13:
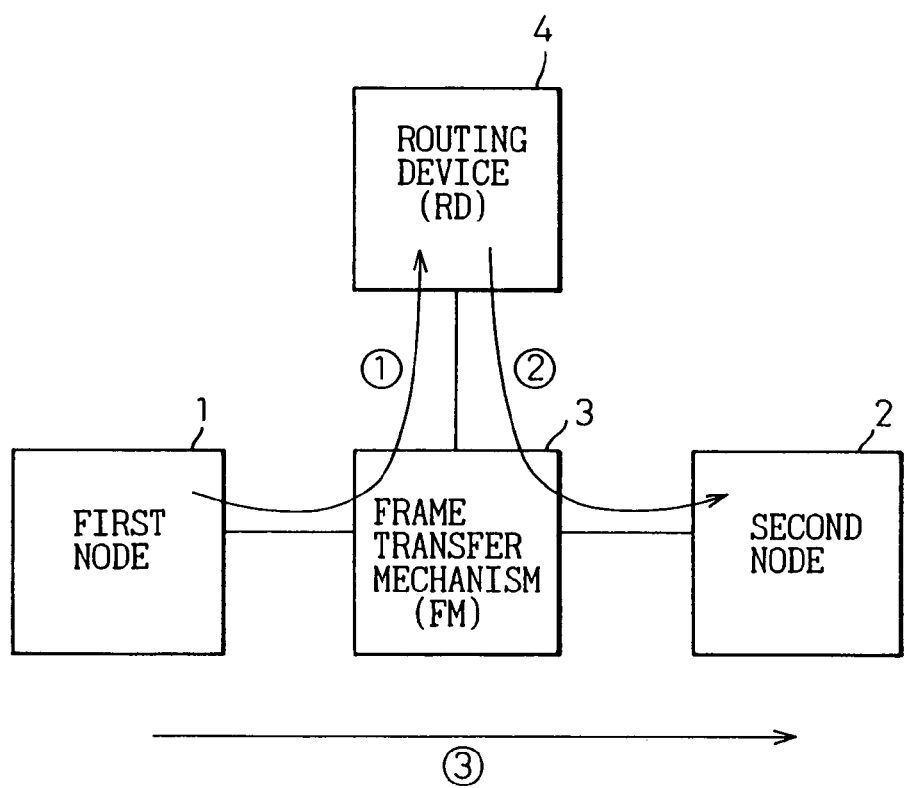
FIG. 13 shows a frame relay mechanism operating according to the first principle operation of the present invention.
Figure 14:
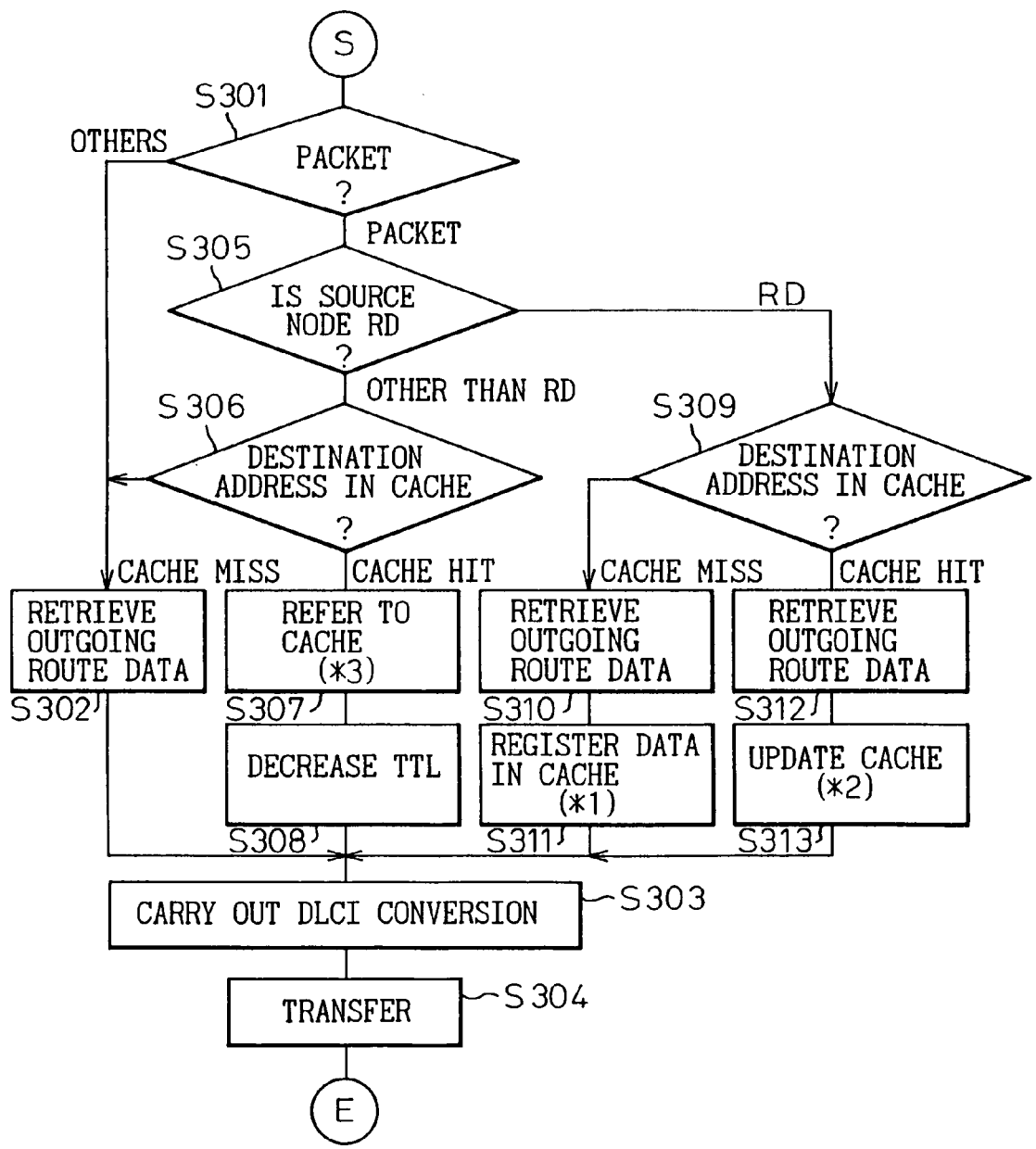
FIG. 14 is a flowchart showing the details of operation of the frame relay mechanism of FIG. 13.

FIGS. 13 to 15C show the frame relay mechanism 3 operating according to the first principle operation of the present invention. The frame relay mechanism 3 has the same functional blocks as those of FIG. 6. FIG. 13 shows an outline of the frame relay mechanism, FIG. 14 is a flowchart showing the details of operation of the frame relay mechanism, and FIGS. 15A to 15C show examples of data in the cache 45. The operation of the frame relay mechanism resembles that of the ATM mechanism of FIGS. 7 to 9C, and therefore, the difference from the ATM mechanism will mainly be explained.

The difference between FIG. 14 and FIG. 8 will be explained. FIG. 14 has no steps corresponding to steps S101, S103, and S107 of FIG. 8, and FIG. 14 carries out DLCI conversion in step S303 instead of VPI and VCI conversions of step S105 of FIG. 8. Since step S101 of FIG. 8 relates to AAL5, the frame relay mechanism 3 of FIG. 14 naturally has no such step. Steps S103 and S107 of FIG. 8 determine whether or not a received cell is a head cell, and therefore, are not necessary for the frame relay mechanism 3 of FIG. 14 because the frame relay mechanism checks DLCI to identify a multiplexed logic channel.

The frame relay mechanism 3 carries out DLCI conversion in step S303 to send a frame to an outgoing route. The contents of the cache 45 shown in FIGS. 15A to 15C are similar to those of FIGS. 9A to 9C. The operation of the frame relay mechanism is understandable by replacing the VPI and VCI process of the ATM mechanism with the DLCI process. Since the details of FIGS. 13 to 15C are understandable from FIGS. 7 to 9C, they will not be explained further.

Figure 16:
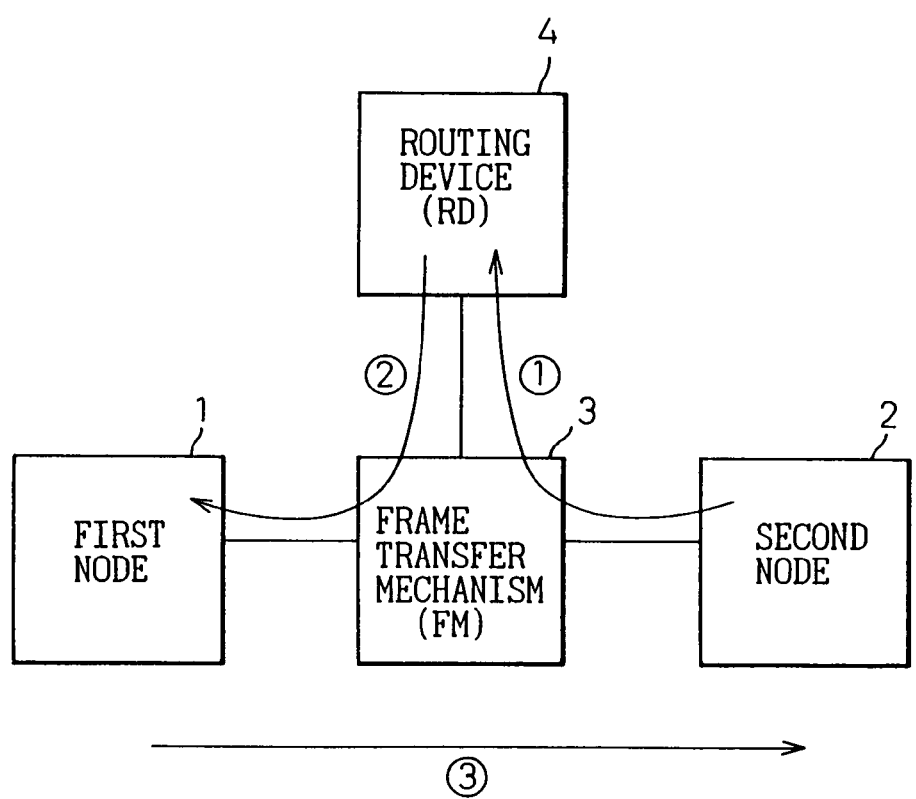
FIG. 16 shows the frame relay mechanism operating according to the second principle operation of the present invention.
Figure 17:
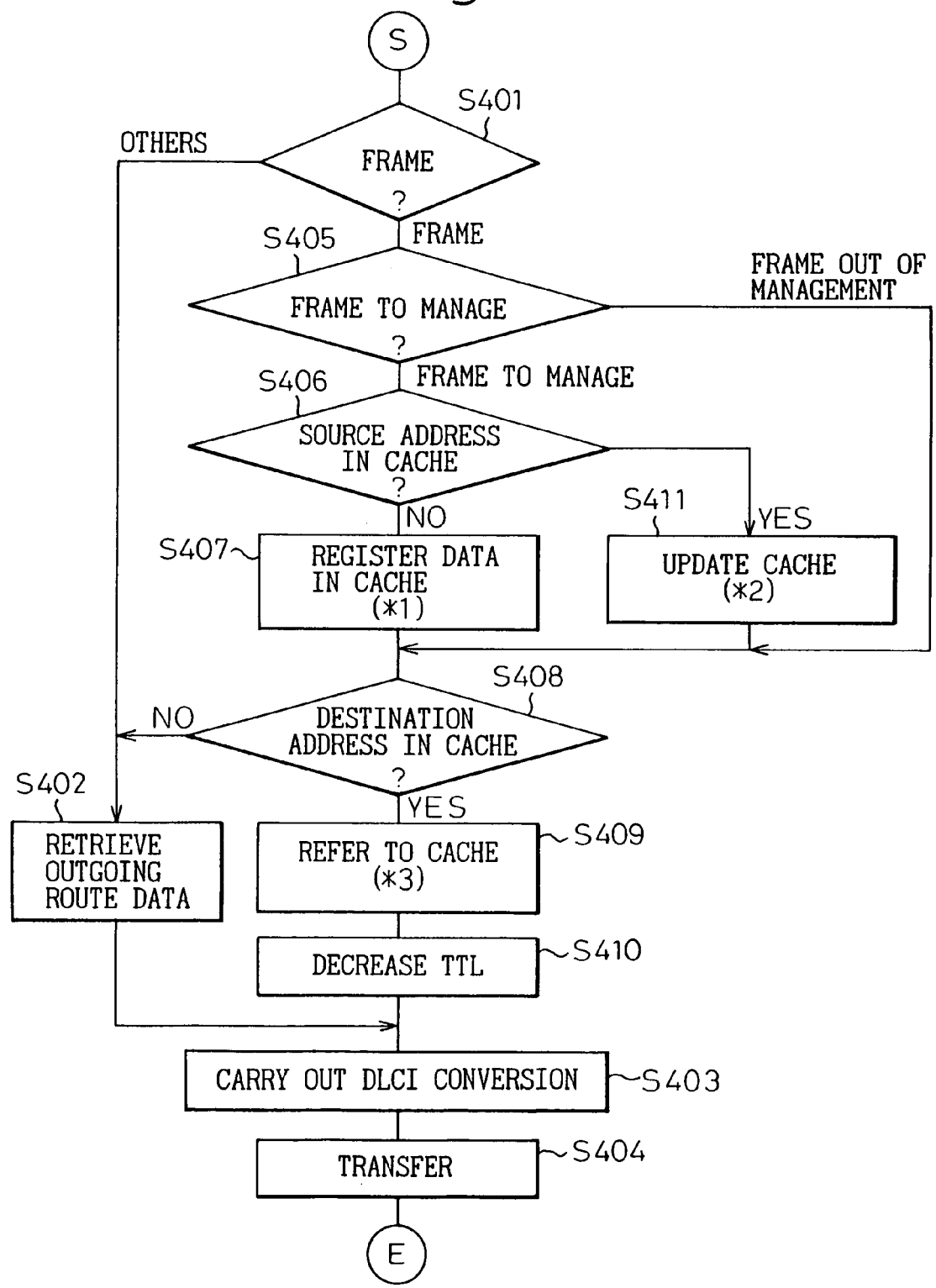
FIG. 17 is a flowchart showing the details of operation of the frame relay mechanism of FIG. 16.

FIGS. 16 to 18C show the frame relay mechanism 3 operating according to the second principle operation of the present invention (FIGS. 4A and 4B), in which FIG. 16 shows an outline of the frame relay mechanism, FIG. 17 is a flowchart showing the details of operation of the same, and FIGS. 18A to 18C show examples of data stored in the cache 45. The difference of FIGS. 16 to 18C from the ATM mechanism of FIGS. 10 to 12C will be simply explained.

FIG. 17 has no steps corresponding to steps S201, S203, and S207 of FIG. 11, and FIG. 17 carries out DLCI conversion in step S403 instead of VPI and VCI conversions of step S205 of FIG. 11. Since step S201 of FIG. 11 relates to AAL5, the frame relay mechanism 3 of FIG. 17 naturally has no such step. Steps S203 and S207 of FIG. 11 are not needed for FIG. 17 because the frame relay mechanism 3 simply checks a DLCI to identify a multiplexed logic channel.

The frame relay mechanism 3 carries out DLCI conversion in step S403 to send a frame to an outgoing route. FIGS. 18A to 18C are substantially the same as FIGS. 12A to 12C if replacing VPI and VCI with DLCI. With these points in mind, the details of operation of FIGS. 16 to 18C will be understood from the explanation made in the above for FIGS. 10 to 12C.

As explained above, the present invention adds a function of memorizing outgoing route data to an ATM switch when transferring data through an ATM network, so that a packet signal is transferred through a shortcut in the ATM switch by bypassing a routing device, without a client-server system or special protocols. This eliminates packet reconstruction, routing, and packet decomposition processes carried out by the routing device. As a result, the present invention reduces the load on the routing device and transfers packet signals through the ATM network at high speed.

Also, the present invention adds a function of memorizing outgoing route data to a frame relay switch when transferring data through a frame relay network, so that a packet signal is transferred through a shortcut in the frame relay switch by bypassing a routing device, without special protocols. This eliminates data preparation, frame preparation, and routing processes from the routing device, thereby reducing the load on the routing device and transferring packet signals through the frame relay network at high speed.

What is claimed is:

1. A cell signal switching apparatus for switching and transferring a cell signal among first and second nodes and a routing device, the nodes having each an interface for the cell signal, the routing device having an interface for the cell signal and determining an outgoing route for the cell signal according to destination data contained in the cell signal, the cell signal being made from a packet signal that contains the destination data, the cell signal switching apparatus comprising:

a switch for making a connection path among the nodes and having a predetermined connection path fixedly or semi-fixedly connected to the routing device;

a memory for caching source data from an input cell signal transmitted from the second node as outgoing route data; and a shortcut controller for forming a shortcut to transmit a cell signal input at the first node directly from the first node to the second node, without routing the cell signal via the predetermined connection path to and from the routing device, when outgoing route data contained in the cell signal input at the first node is equal to outgoing route data cached in the memory, and for caching into the memory source data contained in the input cell signal from the second node as outgoing route data.

2. The apparatus of claim 1, wherein the first and second nodes and packet transfer apparatus form an ATM apparatus.

3. The apparatus of claim 2, wherein the cell signal is an AAL5 ATM signal.

4. The apparatus of claim 2, wherein the output route data stored in the memory includes a destination address and an outgoing port number.

5. A cell signal switching apparatus for switching and transferring a frame signal among first and second nodes and a routing device, the nodes each having an interface for the frame signal, the routing device having an interface for the frame signal and determining an outgoing route for the frame signal according to destination data contained in the frame signal, the frame signal being made from a packet signal that contains the destination data, the cell signal switching apparatus comprising:

a switch for making a connection path among the nodes and having a predetermined connection path fixedly or semi-fixedly connected to the routing device;

a memory for caching source data from an input frame signal received from the second node as outgoing route data; and a shortcut controller for forming a shortcut to transmit a frame signal input at the first node directly from the first node to the second node, without routing the cell signal via the predetermined connection path to and from the routing device, when outgoing route data contained in an input frame signal from the first node is equal to outgoing route data cached in the memory, and caching into the memory source data contained in the input frame signal from the second node as outgoing route data.

6. The apparatus of claim 5, wherein the first and second nodes and packet transfer apparatus form a frame relay apparatus.

7. The apparatus of claim 6, wherein the output route data stored in the memory includes a source address and an incoming port number.

* * * * *